United States Patent
Das et al.

(10) Patent No.: US 8,848,513 B2
(45) Date of Patent: Sep. 30, 2014

(54) SEAMLESS OVERLAY CONNECTIVITY USING MULTI-HOMED OVERLAY NEIGHBORHOODS

(75) Inventors: Saumitra Mohan Das, San Jose, CA (US); Vidya Narayanan, San Diego, CA (US); Arvind S. Krishna, San Diego, CA (US); Deviprasad Putchala, San Diego, CA (US); David Craig, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 454 days.

(21) Appl. No.: 12/869,354

(22) Filed: Aug. 26, 2010

(65) Prior Publication Data

US 2011/0211444 A1  Sep. 1, 2011

Related U.S. Application Data

(60) Provisional application No. 61/239,303, filed on Sep. 2, 2009, provisional application No. 61/239,307, filed on Sep. 2, 2009.

(51) Int. Cl.
| | |
|---|---|
| *G01R 31/08* | (2006.01) |
| *H04L 29/08* | (2006.01) |
| *H04W 36/18* | (2009.01) |
| *H04W 76/02* | (2009.01) |
| *H04W 36/14* | (2009.01) |

(52) U.S. Cl.
CPC ........... *H04L 67/104* (2013.01); *H04W 76/025* (2013.01); *H04L 67/1065* (2013.01); *H04W 36/18* (2013.01); *H04L 67/1046* (2013.01); *H04L 67/1048* (2013.01); *H04L 67/1085* (2013.01); *H04W 36/14* (2013.01)
USPC ........... 370/219; 370/463; 370/400; 370/462; 370/331; 370/338; 370/216

(58) Field of Classification Search
None
See application file for complete search history.

(56) References Cited

U.S. PATENT DOCUMENTS

| 7,245,917 B2 * | 7/2007 | Chiueh | .................. 455/442 |
| 7,376,097 B2 | 5/2008 | Yegin | |

(Continued)

FOREIGN PATENT DOCUMENTS

WO   WO2009093215   7/2009

OTHER PUBLICATIONS

David Sumi, "Multiple wireless access protocols: How to stay simply connected", May 13, 2005, pp. 1-3, http://supercommnews.com/wimax/features/multiple_access_wimax_051305/.

(Continued)

*Primary Examiner* — Kibrom T Hailu
(74) *Attorney, Agent, or Firm* — Kristine U. Ekwueme

(57) ABSTRACT

A communication system enables a node to utilize multiple communication interfaces to connect to an overlay network. The use of multiple communication interfaces provides a redundant overlay network connection, thereby enabling a node to maintain connectivity or select a preferred connection to the overlay network, increasing efficiency or reducing costs in the overlay network. A network in which member nodes obtain services in the absence of server-based infrastructure is referred to as a "peer-to-peer overlay network" (or "overlay network" or simply "overlay"). Overlay networks consist of several nodes from hundreds, to thousands, joined together in a logical routing structure. Individual nodes often participate in routing and maintenance aspects of the overlay. Typically an overlay is formed through the enrollment and joining of all these nodes as defined by the overlay protocol. Nodes forming peer-to-peer overlay networks may communicate with each other over various network technologies.

41 Claims, 10 Drawing Sheets

(56) References Cited

U.S. PATENT DOCUMENTS

| | | | |
|---|---|---|---|
| 7,590,055 B2 | 9/2009 | Segel | |
| 8,014,302 B2* | 9/2011 | Wang | 370/242 |
| 8,175,603 B1* | 5/2012 | Hoole | 455/439 |
| 2004/0233840 A1* | 11/2004 | Bye | 370/210 |
| 2007/0160017 A1 | 7/2007 | Meier et al. | |
| 2009/0125637 A1* | 5/2009 | Matuszewski | 709/238 |

OTHER PUBLICATIONS

Inayat R. et al., "A seamless handoff for dual-interfaced mobile devices in hybrid wireless access networks" Advanced Information Networking and Applications, 2004. AINA 2004. 18th International Conference on Fukuoka, Japan Mar. 29-31, 2004, Piscataway, NJ, USA, IEEE, vol. 1, Mar. 29, 2004, pp. 373-378, XP010695446.

International Search Report and Written Opinion—PCT/US2010/047745, International Search Authority—European Patent Office—Nov. 24, 2010.

Li L. et al., "A SIP-based P2PSIP Client Protocol; draft-li-p2psip-client-protocol-00.t", IETF. Standard-Working-Draft, Internet Engineering Task Force, IETF, CH, Nov. 12, 2007, XP015054261.

Weidong Cui et al., "Backup Path Allocation Based on a Correlated Link Failure Probability Model in Overlay Networks", In Proceedings of ICNP', 2002, pp. 1-10.

Taiwan Search Report—TW099129748—TIPO—Apr. 8, 2014.

\* cited by examiner

SEAMLESS OVERLAY CONNECTIVITY USING MULTI-HOMED OVERLAY NEIGHBORHOODS

CLAIM OF PRIORITY UNDER 35 U.S.C. §119

The present Application for Patent claims priority to Provisional Application No. 61/239,303 entitled "Method and Apparatus for Seamless Overlay Connectivity Using Multi-homed Overlay Neighborhoods" filed Sep. 2, 2009, and to Provisional Application No. 61/239,307 entitled "Method and Apparatus for a Seamless Approach for Overlay/Application Connection Handoff" filed Sep. 2, 2009, each assigned to the assignee hereof and hereby expressly incorporated by reference herein.

BACKGROUND

1. Field

The present disclosure relates to a mobile operating environment, and more particularly, to overlay networks such as structured overlay networks.

2. Background

An overlay network is a virtual network of nodes and logical links that is built on top of an existing network. Examples of an overlay network include, but are not limited to, the Internet, Chord, Content Addressable Network (CAN), Pastry, and Viceroy.

Some overlay networks are organized based on an identifier space, such that a node can determine its position in the overlay network based on its node identifier, such as an IP address.

Further, some overlay networks can store a portion of overlay network data, called a partition, so as to distribute the data across the network to increase network efficiency in storage and retrieval of the data.

Typically, when a node desires to join an overlay network, the node connects to the overlay network, including neighbor overlay network nodes, via a single interface.

This single interface connection creates a problem for the overlay network and the node if the interface goes down or the connectivity of the node to the network changes. Also, this single interface connection creates a similar problem for the overlay network and the node if the node intends to use another interface, such as to realize a lower subscription cost, reduced power consumption or performance increases. Such a change to another interface causes the node to have to rejoin the overlay and to re-establish the overlay connections. Further, the disconnection of the single interface increases overhead for the overlay network, as the data needs to be redistributed and other neighbor connections need to be established.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with a communication system that enables a node to utilize multiple communication interfaces to connect to an overlay network. The use of multiple communication interfaces provides a redundant overlay network connection, thereby enabling a node to maintain connectivity or select a preferred connection to the overlay network, increasing efficiency or reducing costs in the overlay network.

In one aspect, a method is provided for connectivity to an overlay network by communicating with an overlay network from a first node via an original communication interface utilizing a first radio access technology, finding a backup communication interface via a second radio access technology, and connecting to a neighbor node in the overlay network via the backup communication interface while maintaining the original communication interface.

In another aspect, at least one processor provides for connectivity to an overlay network. A first module communicates with an overlay network from a first node via an original communication interface utilizing a first radio access technology. A second module finds a backup communication interface via a second radio access technology. A third module connects to a neighbor node in the overlay network via the backup communication interface while maintaining the original communication interface.

In an additional aspect, a computer program product is provided for connectivity to an overlay network. A non-transitory computer-readable storage medium comprises a first set of instructions for causing a computer to communicate with an overlay network from a first node via an original communication interface utilizing a first radio access technology. A second set of instructions causes the computer to find a backup communication interface via a second radio access technology. A third set of instructions causes the computer to connect to a neighbor node in the overlay network via the backup communication interface while maintaining the original communication interface.

In a further aspect, an apparatus is provided for connectivity to an overlay network. Means are provided for communicating with an overlay network from a first node via an original communication interface utilizing a first radio access technology. Means are provided for finding a backup communication interface via a second radio access technology. Means are provided for connecting to a neighbor node in the overlay network via the backup communication interface while maintaining the original communication interface.

In yet another aspect, an apparatus is provided for connectivity to an overlay network. A transmitter communicates with an overlay network from a first node via an original communication interface utilizing a first radio access technology. A receiver finds a backup communication interface via a second radio access technology. A computing platform connects to a neighbor node in the overlay network via the backup communication interface while maintaining the original communication interface.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
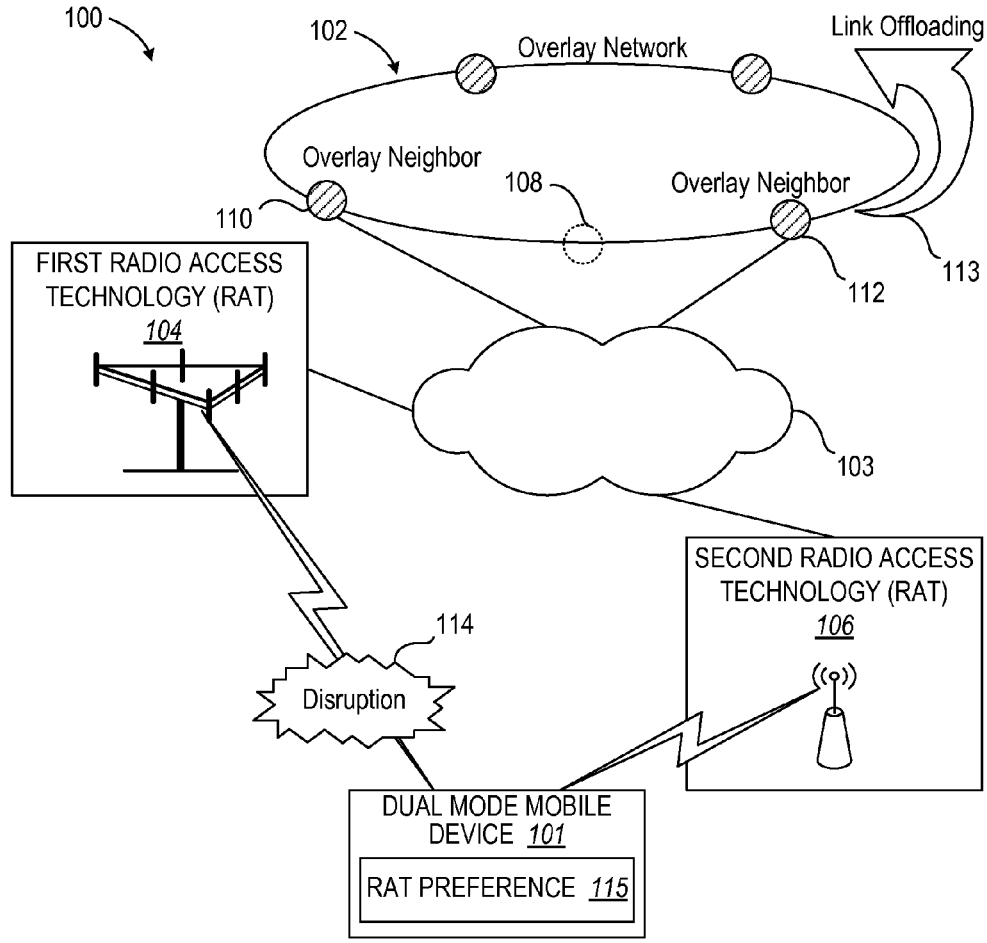
FIG. 1 illustrates a block diagram for connectivity to an overlay network.

A network in which member nodes obtain services in the absence of server-based infrastructure is referred to herein as a "peer-to-peer overlay network" (or "overlay network" or simply "overlay"). Overlay networks consist of several nodes from hundreds, to thousands, joined together in a logical routing structure. Individual nodes often participate in routing and maintenance aspects of the overlay. Typically an overlay is formed through the enrollment and joining of all these nodes as defined by the overlay protocol. Nodes forming peer-to-peer overlay networks may communicate with each other over various network technologies.

An overlay network is a computer network which is built on top of another network. Nodes in the overlay can be thought of as being connected by virtual or logical links, each of which corresponds to a path, perhaps through many physical links, in the underlying network. For example, many peer-to-peer networks are overlay networks that run on top of the Internet. Overlay networks can be constructed in order to permit routing messages to destinations not specified by an IP address. For example, distributed hash tables can be used to route messages to a node having specific logical address, whose IP address is not known in advance. The IP address knowledge of logical addresses is distributed in the overlay for scalability purposes. Overlay networks have also been proposed as a way to improve Internet routing, such as through quality of service guarantees, for example, to achieve higher-quality streaming media. Because overlay networks do not require modification of all routers in the network, an overlay network can be incrementally deployed on end-hosts running the overlay protocol software, without cooperation from a network provider. The overlay may have no control over how packets are routed in the underlying network between two overlay nodes, but it can control, for example, the sequence of overlay nodes a message traverses before reaching its destination. As described in the herein, the overlay network can be characterized as network offloading in that a node can offload the transmission of packets to another node for certain efficiencies and economies. In an aspect, the overlay network achieves this network offloading by link offloading, either at the application layer or the middleware layer, wherein another node can access the packets via the offloaded link rather than receiving the packets from the originating node.

Thus, link offloading for achieving certain advantages for a node is discussed herein as an objective of being a member of the overlay. A disruption in connection to the neighboring nodes in the overlay, however, forces changes in these offloaded links causing an overhead burden on the nodes that remain within the overlay. To that end, it is desirable that more than one connection exist between a node and a neighbor node to avoid a disruption to the overlay due to an inadvertent or intended switch in a connection. In particular, two communication interfaces from different radio access technologies (e.g., picocell, femtocell, macrocell, Local Access Network (LAN), Wide Area Network (WAN), etc.) can be accessible and switched between in a seamless handover that is transparent to the other nodes in the overlay.

To that end, in an aspect described herein, a system is operable to provide optimized device interaction with an overlay network from a first node through managed interface connections, including maintaining two connections to provide a robust overlay experience, or handing over from one connection to another depending on link characteristics. In either case, the aspects include communicating via a first interface, determining one or more available other available interfaces, connecting via one of the available interfaces, and then either maintaining both interfaces or handing over the communication with the overlay to the second interface.

As described herein, in an aspect, a seamless overlay connectivity experience uses multi-homed overlay neighborhoods to avoid shortcomings for using a single interface. The multi-homed overlay neighborhoods described herein avoid problems encountered in prior overlay networks, where change to an interface causes a node in the overlay to have to rejoin the overlay and to re-establish the overlay connections. Further, the multi-homed overlay networks described herein are more efficient, as the disconnection of the single interface in prior systems increases overhead for the overlay network, as the data needs to be redistributed and other neighbor connections need to be established.

In one aspect, a node wishing to join an overlay connects to a bootstrap node in order to join the overlay and place itself correctly in the overlay network. In an aspect, for example, a distributed hash table (e.g., IETF P2PSIP RELOAD) may be utilized by the node to place itself logically in the correct place, such as in a circular node identifier (ID) space. In an aspect, a single interface may be used to send a JOIN message to the bootstrap node in order to join the network. Subsequently, connections are setup to other nodes in the overlay, for example, nodes that are part of a routing table of the new node, by sending JOIN messages to the relevant node ids. In an aspect, the interface could be an Internet connected interface such as a Wireless Wide Area Network (WWAN) or Wireless Local Area Network (WLAN) in an infrastructure mode, or a locally connected interface such as BLUETOOTH short range wireless connectivity standard, or WLAN in an ad hoc mode.

As nodes move, their interfaces may go down or change their connectivity mode. For example, the WLAN interface may switch from ad hoc to disconnected to infrastructure mode. In this scenario, all connections to the overlay will go down and the node needs to reconnect to the overlay network by JOINING all over again through a Bootstrap Peer (BP) node. This also causes churn in the overlay network because immediate neighbors notice the node going in and out. Churn leads to energy drain and overhead in reconfiguring the routing state in the overlay.

One described aspect prescribes the use of multiple interfaces to be used simultaneously for connecting a node to immediate routing neighbors in any overlay. The immediate routing neighbors are those neighbors that need to keep track of a node for ensuring correctness of routing (also called successors in Internet Engineering Task Force (IETF) Peer-to-Peer Session Initiation Protocol (P2PSIP)). In contrast, other neighbors (also called fingers) are non-necessary for correctness, but instead are kept track of to reduce lookup latency in the overlay.

The following method is disclosed: When a node X joins an overlay through an original interface and determines its immediate neighbor set, say $Y_1 \ldots Y_k$, the node then searches for additional interfaces that are up or operational. Node X then chooses the most available of such interfaces OR one at random OR one set by policy to be used as a backup, and then makes redundant connections to the immediate neighbor nodes via the backup interface. Note that it is possible that data traffic is routed via the original interface used to join the network, and this may even be a local network interface such as WLAN in ad hoc mode.

However, in the case that disconnection of the original interface occurs, the backup or alternate interface can be used to immediately route into the network and not cause churn in the overlay since the immediate neighbors can still reach node X. The disconnection of the original interface can also occur at the volition of node X. In this way, node X always maintains multiple entry points in the overlay network by creating connections to immediate neighbors via multiple interfaces. Further, the disconnection can be anticipated by the node X in order to use a preferred connection.

It should be appreciated with the benefit of the present disclosure that the described aspects can reduce latency and unresponsiveness of applications for a node on an overlay in the presence of mobility and disconnection/reconfiguration of interfaces. The present aspects can enable easily using ad hoc network optimizations for network offload. For example, if the node goes in and out of local network connectivity, the node can still route messages into the overlay for lookups and file retrieval. The present aspects can reduce observed churn in the overlay, which reduces overhead associated with control traffic in the overlay.

In other aspects, the apparatus and methods described herein prescribe an intelligent switching from one interface to another interface for use in communicating with the overlay network. Examples disclosed provide solutions for a seamless approach for handing off overlay and application connections between WAN or WWAN technologies. Disclosed examples may be used for enabling local network routing optimization via offloading middleware/application connections from WWAN connections such as Ev-D0 to local networks such as Infrastructure/ad hoc WiFi without disrupting application or overlay communication.

Participants in an overlay are usually geographically dispersed and connected via the Internet. Mobile overlay participants (such as users using cell phones, smartbooks and netbooks) may need to or want to use different WAN/WWAN technologies at different times for overlay/application communication. For example, a user may join, and participate in an overlay using WWAN (EvDo) link while driving home. On reaching home, a user may want to switch to a locally available WiFi Access point at home. This may be due to more bandwidth and/or minimizing cost to the user. Also, users participating in a local overlay, (where all or most of the participants are located within the same geographic area such as a conference room), may want to offload their communication from WWAN link to a completely local network such as Ad hoc WiFi to improve Quality of Service (QoS) parameters such as bandwidth, delay and jitter. The problem is to make the switch seamlessly, i.e., without disrupting the overlay and application communication.

Various aspects of the disclosure are further described below. It should be apparent that the teaching herein can be embodied in a wide variety of forms and that any specific structure or function disclosed herein is merely representative. Based on the teachings herein one skilled in the art should appreciate that an aspect disclosed herein can be implemented independently of other aspects and that two or more of these aspects can be combined in various ways. For example, an apparatus can be implemented or a method practiced using any number of the aspects set forth herein. In addition, an apparatus can be implemented or a method practiced using other structure or functionality in addition to or other than one or more of the aspects set forth herein. As an example, many of the methods, devices, systems, and apparatuses described herein are described in the context of providing dynamic queries and recommendations in a mobile communication environment. One skilled in the art should appreciate that similar techniques could apply to other communication and non-communication environments as well.

As used in this disclosure, the term "content" and "objects" are used to describe any type of application, multimedia file, image file, executable, program, web page, script, document, presentation, message, data, meta-data, or any other type of media or information that may be rendered, processed, or executed on a device.

As used in this disclosure, the terms "component," "system," "module," and the like are intended to refer to a computer-related entity, either hardware, software, software in execution, firmware, middle ware, microcode, or any combination thereof. For example, a component can be, but is not limited to being, a process running on a processor, a processor, an object, an executable, a thread of execution, a program, or a computer. One or more components can reside within a process or thread of execution and a component can be localized on one computer or distributed between two or more computers. Further, these components can execute from various computer readable media having various data structures stored thereon. The components can communicate by way of local or remote processes such as in accordance with a signal having one or more data packets (e.g., data from one component interacting with another component in a local system, distributed system, or across a network such as the Internet with other systems by way of the signal). Additionally, components of systems described herein can be rearranged or complemented by additional components in order to facilitate achieving the various aspects, goals, advantages, etc., described with regard thereto, and are not limited to the precise configurations set forth in a given figure, as will be appreciated by one skilled in the art.

Additionally, the various illustrative logics, logical blocks, modules, and circuits described in connection with the aspects disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein. A general-purpose processor can be a microprocessor, but, in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other suitable configuration. Additionally, at least one processor can comprise one or more modules operable to perform one or more of the operations or actions described herein.

Moreover, various aspects or features described herein can be implemented as a method, apparatus, or article of manufacture using standard programming or engineering techniques. Further, the operations or actions of a method or algorithm described in connection with the aspects disclosed herein can be embodied directly in hardware, in a software module executed by a processor, or in a combination of the two. Additionally, in some aspects, the operations or actions of a method or algorithm can reside as at least one or any combination or set of codes or instructions on a machine-readable medium or computer readable medium, which can be incorporated into a computer program product. Further, the term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., card, stick, key drive, etc.). Additionally, various storage media described herein can represent one or more devices or other machine-readable media for storing information. The term "machine-readable medium" can include, without being limited to, wireless channels and various other media capable of storing, containing, or carrying instruction, or data.

Furthermore, various aspects are described herein in connection with a mobile device. A mobile device can also be called a system, a subscriber unit, a subscriber station, mobile station, mobile, mobile device, cellular device, multi-mode device, remote station, remote terminal, access terminal, user terminal, user agent, a user device, or user equipment, or the like. A subscriber station can be a cellular telephone, a cordless telephone, a Session Initiation Protocol (SIP) phone, a wireless local loop (WLL) station, a personal digital assistant (PDA), a handheld device having wireless connection capability, or other processing device connected to a wireless modem or similar mechanism facilitating wireless communication with a processing device.

In addition to the foregoing, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. Furthermore, as used in this application and the appended claims, the term "or" is intended to mean an inclusive "or" rather than an exclusive "or." That is, unless specified otherwise, or clear from context, "X employs A or B" is intended to mean any of the natural inclusive permutations. That is, in this example, X could employ A, or X could employ B, or X could employ both A and B, and thus the statement "X employs A or B" is satisfied under any of the foregoing instances. In addition, the articles "a" and "an" as used in this application and the appended claims should generally be construed to mean "one or more" unless specified otherwise or clear from context to be directed to a singular form.

As used herein, the terms to "infer" or "inference" refer generally to the process of reasoning about or deducing states of a system, environment, or user from a set of observations as captured via events or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events or data. Such inference results in the construction of new events or actions from a set of observed events or stored event data, whether or not the events are correlated in close temporal proximity, and whether the events and data come from one or several event and data sources.

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form in order to facilitate describing these aspects.

In FIG. 1, in a communication system 100, an apparatus, depicted as a dual-mode mobile device 101 is capable of connecting to an overlay network 102 that is supported by an underlying network 103.

The mobile device 101 may connect to the overlay network 102 via two different access technologies wherein one or both are radio access technologies. The two access technologies are depicted as a long range air link (e.g., third or fourth generation 3G/4G cellular communication system) 104 and a short range wireless link 106. In some aspects, the two connections are maintained at once, at least until one of the connections is lost, such that one of the two connections acts as a backup. In other aspects, the two connections are maintained only long enough to switch the communication with the overlay network from one connection to the other connection. In any case, the mobile device 101 joins the overlay network 102 via one of the two radio access technologies 104, 106. For example, based on a protocol for a structured overlay network, mobile device 101 may join overlay network 102, at a particular routing position 108 between adjacent neighbor nodes 110 and 112, for example, based on a node identifier.

For example, at about the same time, or upon a triggering event, the mobile device 101 finds a backup communication interface, which is the other of the two radio access technologies 104, 106 not being used as the original communication interface. Then, the mobile device 101 connects to one or both neighbor nodes 110 and 112 in the overlay network 102 via the backup communication interface while maintaining the original communication interface, either to maintain a backup connection or to initiate a switch of the communication with the overlay network 102.

In some aspects, such as when both connections are maintained continuously, the mobile device 101 and the overlay network 102 experience a robust connection that can be maintained even if one of the connections is lost, as depicted at 114. Thus, link offloading 113 can be continued without an overhead impact for the overlay network 102 to set up a different link. In addition, the mobile device 101 does not experience an interruption in participation in the overlay network 102. It should be appreciated that, in other aspects, the disruption 114 can occur in the backup connection via the second radio access technology 106. For example, the disruption can be an unavailable original communication interface, a data capacity of the original communication interface below a minimum threshold value, or an error rate of the original communication interface above a maximum threshold value.

In other aspects, by virtue of the foregoing, the mobile device 101 can exploit differences in the two radio access technologies, such as coverage area, cost of resources, capacity, Quality of Service (QoS), availability, etc., to switch between the communication interfaces for interactions with the overlay network 102. To that end, the mobile device 101 can determine a preference 115 for one of the two radio access technologies 104, 106 and trigger a switch. For example, the preference can be based upon a subscription cost associated with use of a selected radio access technology. In some instances, a minimal connection to the non-preferred radio access technology 104, 106 can be maintained as a backup while transferring the connection over to the preferred radio technology 104, 106. For example, billing for use of a macro cell can be based upon the amount of data transmitted rather than merely camping on the macro cell. Thus, the macro cell can serve as a backup should a disruption subsequently occur for the preferred radio access technology, such as a femto cell, LAN, WLAN or WWAN.

Figure 2:
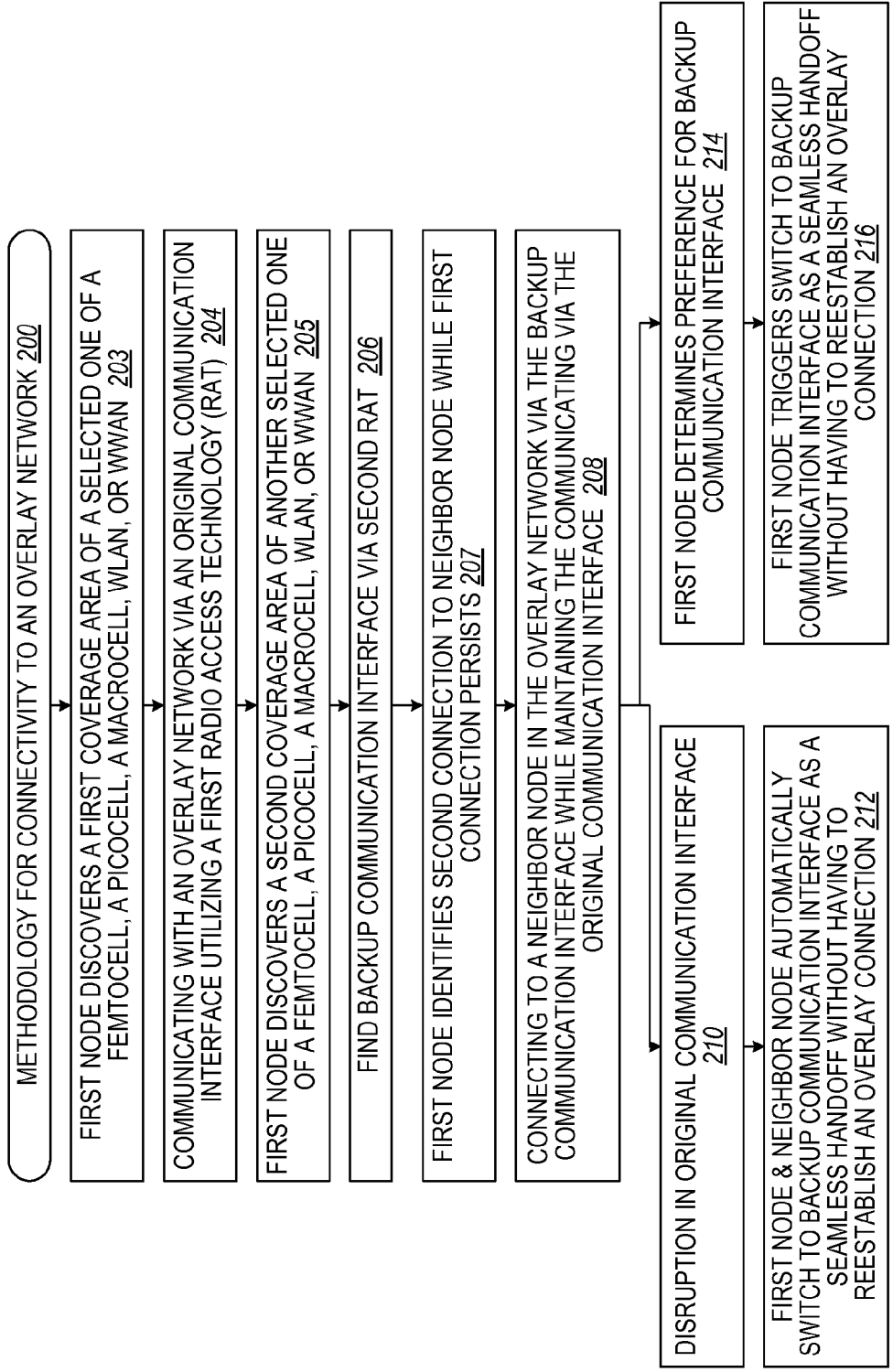
FIG. 2 illustrates a methodology or sequence of operations for connectivity to an overlay network.

In FIG. 2, in an aspect of maintaining a backup connection to an overlay network, a methodology or sequence of operations 200 is provided for connectivity to an overlay network. A first node communicates with a neighbor node of the overlay network via an original communication interface utilizing a first radio access technology (block 204). For example, the first node has previously discovered that it is within a first coverage area of a selected one of a femtocell, a picocell, a macrocell, a Wireless Local Area Network (WLAN), or a Wireless Wide Area Network (WWAN) (block 203). The first node finds a backup communication interface via a second radio access technology (block 206). For example, the first node discovers that it is also within a second coverage area of another selected one of a femtocell, a picocell, a macrocell, a WLAN, or a WWAN (block 205). The first node identifies the second connection to the neighbor node while the first connection persists (block 207). Further, in some aspects such as to maintain a robust connection or to switch to a preferred interface or network, the first node connects to the neighbor node in the overlay network via the backup communication interface while maintaining the communicating via the original communication interface (block 208).

For example, with redundant communication interfaces on different radio access technologies established, in one aspect, a disruption in the original communication interface occurs (block 210). The first node and the neighbor node in the overlay can automatically switch from using the original communication interface to the backup communication interface as a seamless handoff without having to reestablish an overlay connection (block 212).

Alternatively or in addition, for example, the first node determines a preference for using the backup communication interface over the original communication interface (e.g., QoS, cost to use, available throughput, channel delay, etc.) (block 214). The first node triggers switching from the original communication interface to the backup communication to perform a seamless handoff without reestablishing an overlay connection (block 216).

Figure 3:
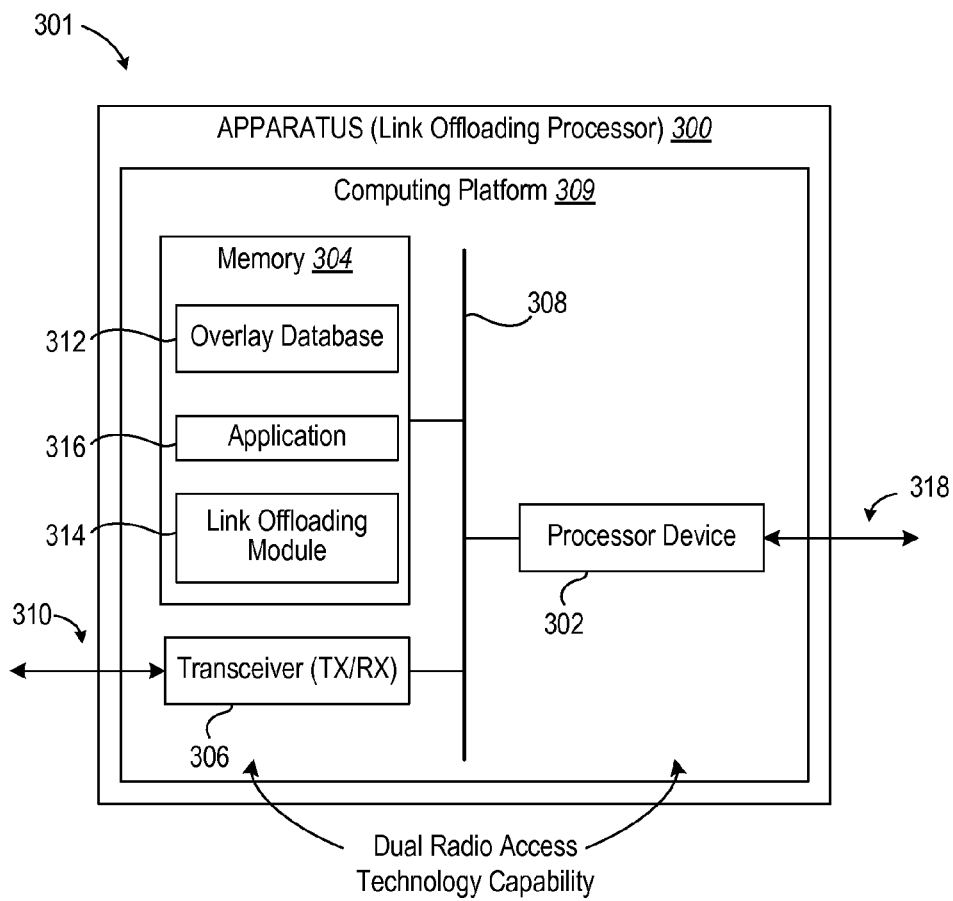
FIG. 3 illustrates a block diagram of an exemplary computing environment for connectivity to an overlay network.

In FIG. 3, an exemplary apparatus, depicted as a processor 300, is for use at a node in aspects of a peer-to-peer overlay link offloading system 301 that can maintain connections simultaneously on two different radio access technologies between a node and a neighbor node to support a seamless handover. Thus, other members of the overlay need not be impacted by the handover. The link offloading processor 300 comprises processor device 302, memory 304, and transceiver (i.e., transmitter(s) and receiver(s)) 306 all coupled to a data bus 308 to form a computing platform 309. It should be noted that the link offloading processor 300 is just one implementation and that other implementations are possible within the scope of the aspects. Further, it should be noted that processor 300 may include a mobile communication device or mobile terminal.

The transceiver 306 comprises hardware and/or hardware executing software that operates to allow the link offloading processor 300 to communicate data or other information with a plurality of nodes on a network. It should be appreciated with the benefit of the present disclosure that there can be one transmitter (TX)/receiver (RX) that connects to various communication modules so that the device can talk over various interfaces, or there can be a plurality of TX/RX, e.g., one for each communication interface. For instance, the transceiver 306 can participate in advertising services on the overlay. In an aspect, the transceiver 306 is operable to transmit a search query over a link 310 of a LAN, WWAN, PAN or other network using unicast, multicast, or broadcast transmissions, and to receive query results, or to send/receive link offloading parameters, middleware and application connections.

The memory 304 comprises any suitable storage device operable to store an overlay database 312 comprising information (i.e., meta-data) associated with one or more peer-to-peer overlay networks that the link offloading processor 300 is aware of. The memory 304 also comprises link offloading module ("middleware") 314 that comprises one or more modules comprising instructions or codes executable by the processor device 302 to provide the functions of the peer-to-peer overlay network link offloading system 301. For instance, an application module 316 that is supported by middleware 314 can execute without having to be aware of the link offloading.

The processor device 302 comprises at least one of a Central Processing Unit (CPU), processor, gate array, hardware logic, memory elements, and/or hardware executing software. In an aspect, the processor device 302 operates to execute instructions of the link offloading module 314 to control the link offloading processor 300 to perform the functions of the peer-to-peer overlay network link offloading system 301, as described herein.

During operation, the processor device 302 operates to maintain the overlay database 312 with information about overlay networks that the link offloading processor 300 becomes aware of. For instance, applications hosted by the processor 300 may make requests to the processor device 302 via a link 318. For example, during normal message routing and network communications, the processor device 302 becomes aware of information and/or meta-data associated with one or more overlay networks pertinent to link offloading. The processor device 302 operates to store this information and/or meta-data in the overlay database 312. For example, the information and meta-data associated with overlay networks comprises, but is not limited to the following information:

(1) Overlay network names;
(2) Node addresses;
(3) Introducer node addresses;
(4) Content types;
(5) Specific content;
(6) Quality of service (QoS) parameters;
(7) Overlay network operating region; and
(8) Overlay network type.

In an aspect, the peer-to-peer overlay network link offloading system 301 comprises a computer program product having one or more program instructions ("instructions") or sets of "codes" stored or embodied on a non-transitory machine-readable medium. When the codes are executed by at least one processor, for instance, the processor device 302, their execution causes the link offloading processor 300 to provide the functions of the peer-to-peer overlay network link offloading system 301. For example, the machine-readable medium comprises a floppy disk, CDROM, memory card, FLASH memory device, Random Access Memory (RAM), Read Only Memory (ROM), or any other type of memory device or machine-readable medium that interfaces to the link offloading processor 300. In another aspect, the sets of codes may be downloaded into the link offloading processor 300 from an external device or communication network resource. The sets of codes, when executed, operate to provide the functions of a peer-to-peer overlay network link offloading system 301.

Figure 4A:
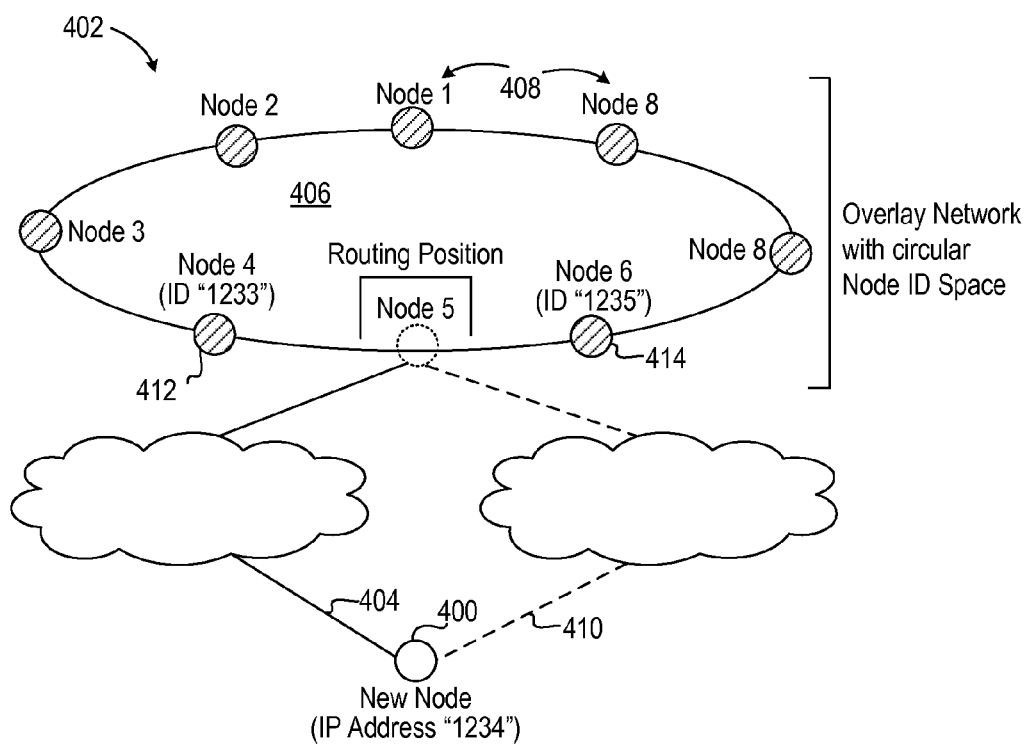
FIG. 4A illustrates a block diagram for a new node forming multiple communication interfaces to an overlay network.

Robust, Multi-Homed Overlay Connection:

In one aspect, in FIG. 4A, a new node 400 discovers an overlay network 402 and joins the overlay network 402 via an original communication interface 404. In particular, in the case where the overlay network 402 comprises a structured network with, for example, a circular identifier space 406, the new node 400 determines its routing position in the overlay network 402, for example, based on its node identifier (e.g. an IP address). In the illustrative depiction, the overlay network 402 further comprises seven other nodes 408. For example, if the new node 400 has an IP address of 1234, then it finds its logical position to be adjacent to the closest higher and lower IP addresses of other nodes 408 in the overlay network 402. These nodes, i.e. node 4 and node 6, may be referred to as the immediate neighbor set of the new node (node 5) 400, wherein the next higher identifier is the successor (node 6) to the new node 400 in the routing, and wherein the new node (node 5) 400 is the successor to the next lower identifier (node 4) in the routing.

Then, the new node 400 determines if any other communication interfaces are available. The new node 400 selects one of the other available communication interfaces to use as a backup communication interface 410. The communication interfaces may be any of a WWAN, a WLAN, or a proximity-based interface such as BLUETOOTH, Peanut, etc. For example, the selection may be based on, but is not limited to, which one of the other interfaces are most available, a random selection, or a policy/rule.

Then, the new node 400 establishes the backup connection 410 to the overlay network 402 and the immediate neighbor set, as depicted at 412, 414, via the backup communication interface 410.

Thus, the new node 400 has multiple connections to the overlay network 402 via multiple interfaces, thereby improving overlay network efficiency by allowing continued participation in the overlay network even if one of the communication interfaces goes down.

Figure 4B:
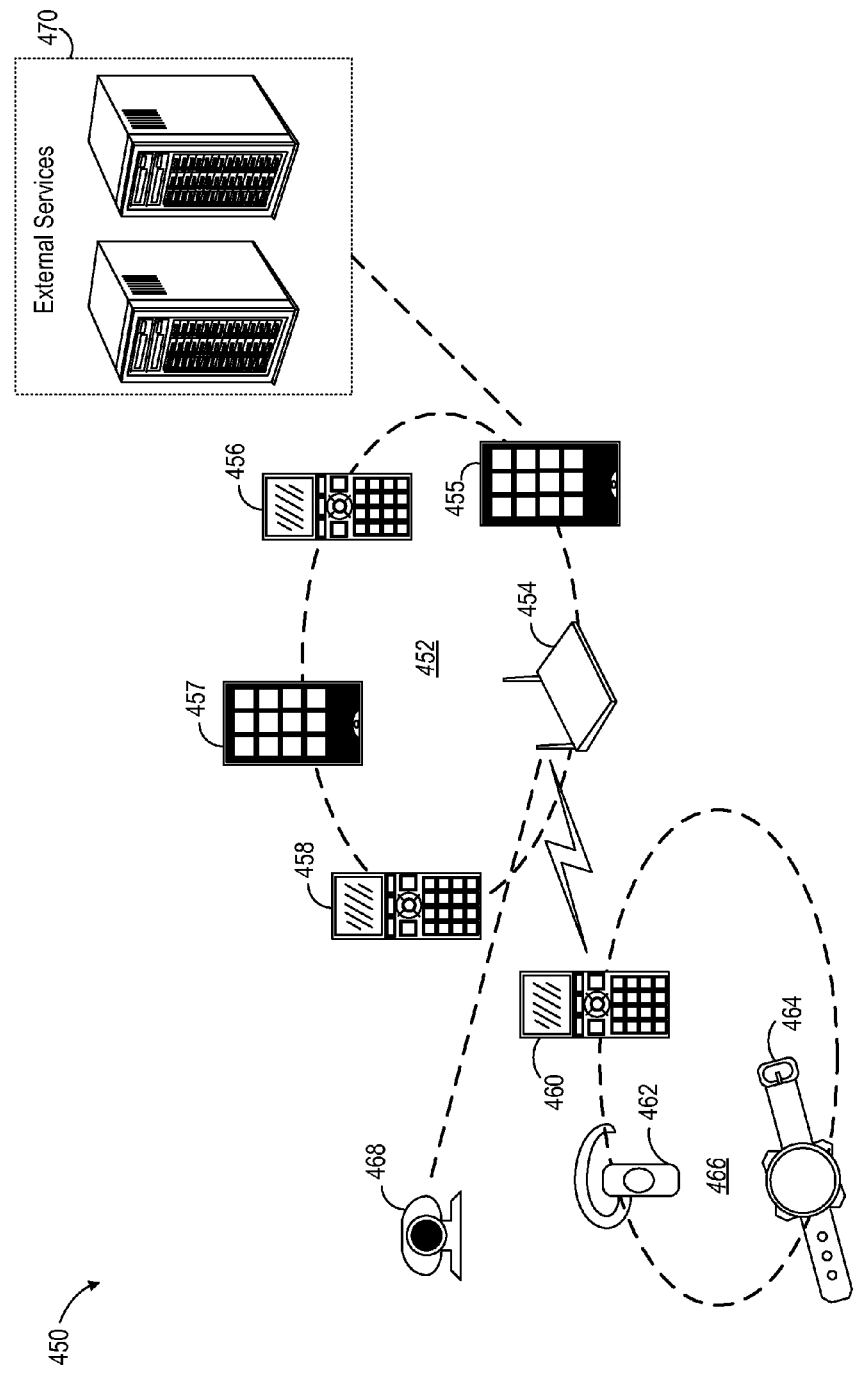
FIG. 4B illustrates a block diagram for an exemplary communication system benefits from multi-homed overlay neighborhoods.

In FIG. 4B, in an aspect, an exemplary communication system 450 that can benefit from multi-homed overlay neighborhoods includes an overlay 452 formed by routing peers 454-458. Routing peer 454 acts as an overlay attachment point to the other routing peers 455-458, depicted as mobile devices, and as a proxy to a projector (not shown). For instance, routing peer 454 is in wireless communication to a non-routing peer 460, depicted a mobile device, that acts as proxy for non-peers, such as a headset 462 and a wristwatch 464 that are part of a Personal-Access Network or body-area network 466. The routing peer 454 can also act as proxy to a non-peer service that is not part of the body-area network 466, such as a webcam 468. The routing peer 455 can act as a proxy to external services 470.

Figure 5A:
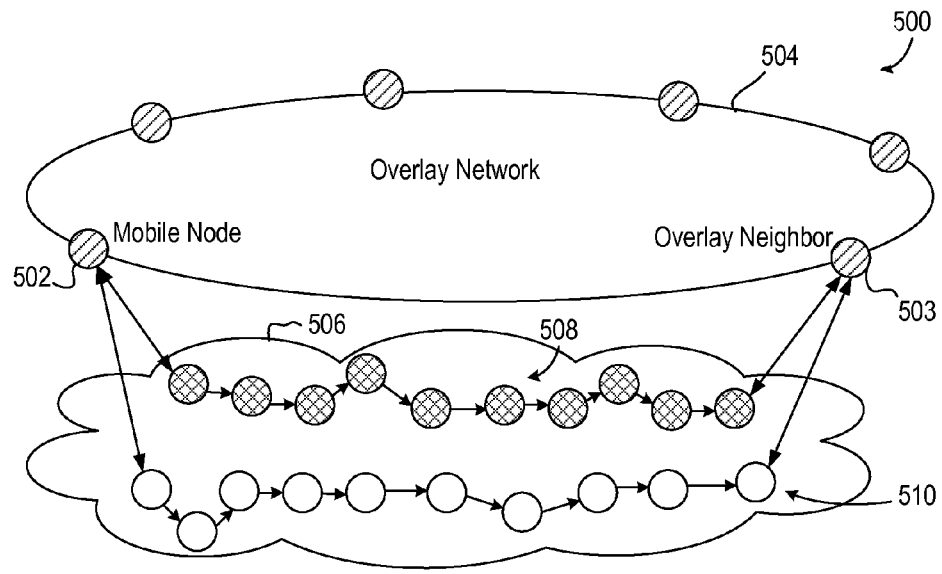
FIG. 5A illustrates a block diagram for an overlay network in which both a mobile node and a neighboring node have multiple interfaces.

In FIG. 5A, in an aspect, a communication system 500 can provide for a mobile node 502 and an overlay neighbor 503 to be part of an overlay network 504, where both mobile node 502 and overlay neighbor 503 have multiple interfaces to connect to overlay network 504. For example, a network such as the Internet 506 provides a plurality of interfaces, depicted as a first physical path 508 and a second physical path 510, between the mobile node and an overlay neighbor 503.

Figure 5B:
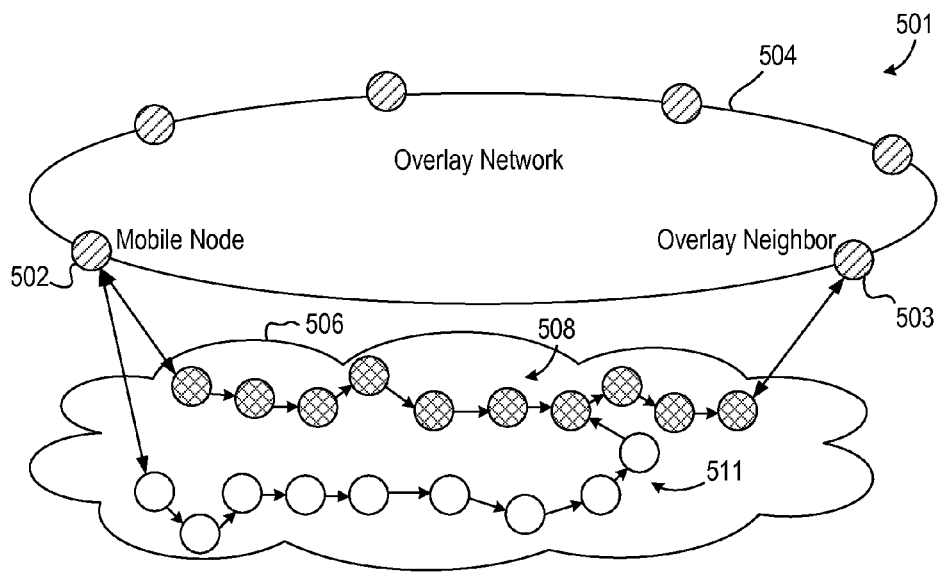
FIG. 5B illustrates a block diagram for the overlay network of FIG. 5B in which the neighboring node has a single interface.

In FIG. 5B, in another aspect, a communication system 501 can provide for mobile node 502 and overlay neighbor 503 to be part of overlay network 504, where mobile node 502 has multiple interfaces to connect to overlay network 504 and where and overlay neighbor 503 has a single interface to connect to overlay network 504. For example, a network such as the Internet 506 provides a first physical path 508 and a second physical path 511 between mobile node 502 and overlay neighbor 503. As such, in this aspect, not all nodes in an overlay network need to have multiple connections to the overlay via multiple communication interfaces.

Link Offloading in an Ad Hoc Overlay:

In a further aspect, users in an ad-hoc overlay, or any overlay for that matter, may choose to offload communication from one interface or link to another interface or link, such as from a WAN link to a more local mechanism such as Ad-hoc WiFi or infra WiFi or Personal Access Network (PAN) (e.g., BLUETOOTH) if one is available. It desirable that a link offloading capability should thus encompass one or more of these technologies (e.g., ad-hoc WiFi, infra WiFi and BLUETOOTH). This will be discussed below with respect to an ad-hoc WiFi technology.

While ad-hoc WiFi can be unstable and ad-hoc networks are generally temporary in nature, off-loading middleware connections (links) can achieve certain objects nonetheless, as opposed to just offloading application connections only. For example, applications can determine that it make sense for them to use ad-hoc WiFi for transferring large files. Analytical results from simulating large file transfer behavior on mobile devices such as phones have shown that using 3G links for communication causes significant overhead in terms of reducing battery life. The consensus from the simulation results shows a need to offload middleware connections to extend battery life. Other factors also include offloading bandwidth to more local links, which are usually free or no charge, as opposed to 3G links with fixed/variable costs.

In an exemplary aspect, a host may be using WWAN link via interface E1 for its overlay/application communication and may desire to switch to using Infrastructure WiFi (interface W1). For each connection (application/middleware), the host initiating the handoff, sends a message to initiate connection (CONNECT message) to its peer. This message includes local IP address and port information, (called candidates), from available interfaces. In this process, the host includes candidates from both E1 and W1. However, the initiator associates higher priority (higher numerical value) to the candidate it wants to switch to (in this case W1). In one example, a sender may send candidates corresponding to W1 and not include E1. It is important to note that the CONNECT message is sent directly via the existing connection to the recipient and not routed in the overlay. The recipient, on receiving the CONNECT message gathers its local candidates, from its local interfaces, and sends a CONNECT response message. This message is also sent over the direct connection and not routed in the overlay. Using the candidates exchanged, both sides initiate connection to each other in priority order, (i.e., sender will try W1's candidate first before trying E2.) and checks to see if a connection can be established to the recipient. If he is successful, then he replaces his existing connection with the newly formed one. If not, then a switch is not made. When a switch is made from WWAN link to a local network (e.g., using ad hoc WiFi or BLUETOOTH), some special considerations are necessary for overlay connections. The middleware also maintains a WWAN connection to its immediate predecessor and successor in addition to the local ones. These backup connections allow the host to still be part of the overlay and operate without any disruptions when connections from the local network break (this may happen when a mobile user goes out of range of the local network).

Disclosed examples provide seamless handoff between different communication technologies with minimal disruption (if any) to middleware and application communications. The switching is itself transparent to the applications that run atop the middleware. In addition, the old connection is used to exchange the CONNECT messages directly rather than having to route the messages in the overlay. This minimizes connection setup time. Maintaining WWAN links for immediate predecessor and successor when switching to a local network, allows hosts to still be part of the overlay and operate without any disruptions when local connections break thereby improving robustness.

Figure 6:
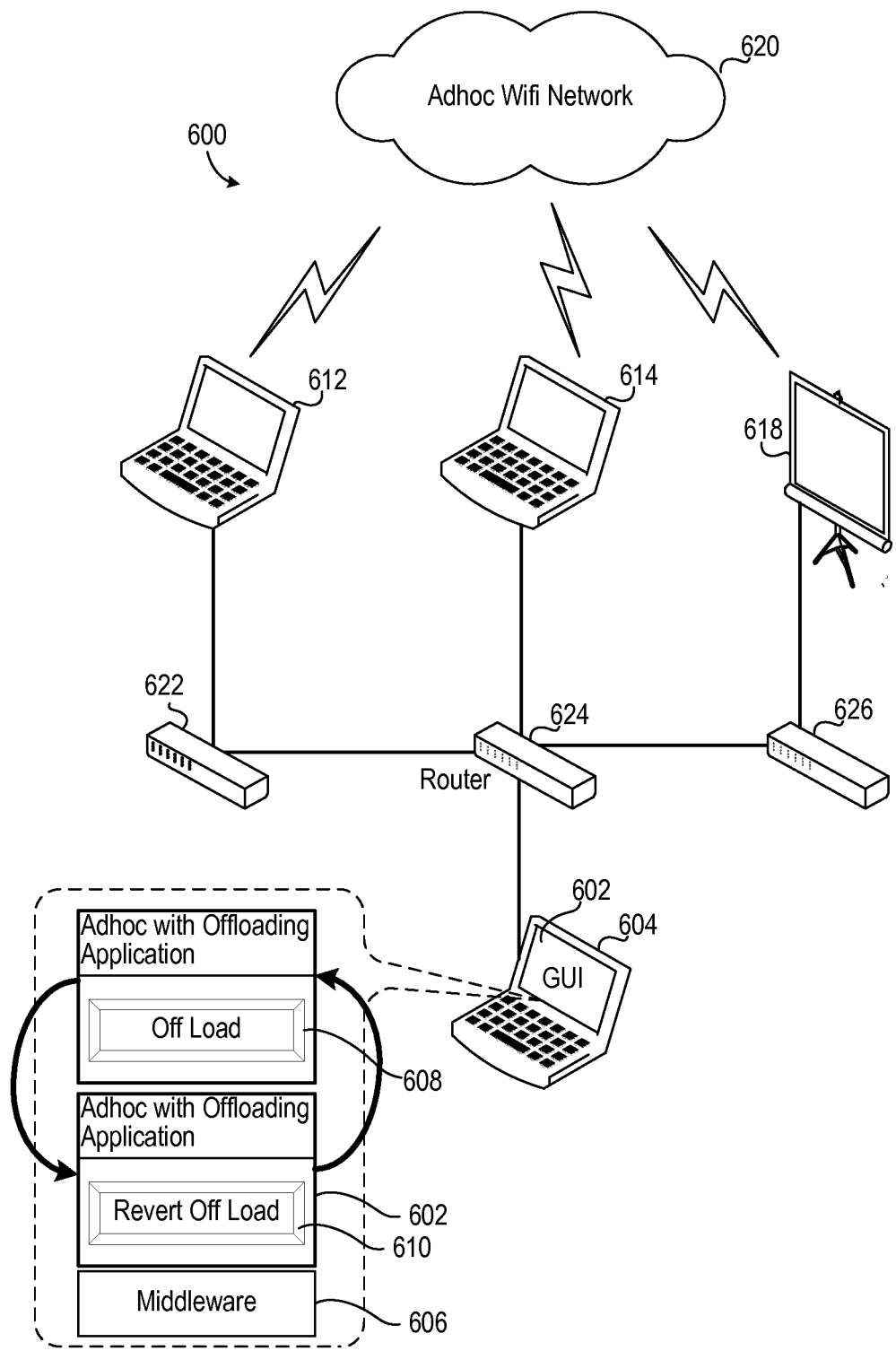
FIG. 6 illustrates a block diagram of a demonstration setup including a mock up of an offloading application Graphical User Interface (GUI) executed by a remote node that runs link offloading middleware.

In FIG. 6, in one aspect a setup 600 includes an offloading application Graphical User Interface (GUI) 602 executed by a remote node 604 that runs link offloading middleware 606. Specifically, a user can sequentially select an offload control 608 and "a revert off load" control 610. A camera host 612, a Bundle Protocol (BP) node 614, and an Ultra-Mobile Personal Computer (UMPC) running as a Network Radio Proxy (NRP) display 618 each are in wireless communication with an ad-hoc WiFi network 620. The camera host 612 and BP node 614 each run link offloading middleware 606. The former communicates with the remote node 604 via a Network Address Translation (NAT) 622 which in turn communicates to a router 624. The latter communicates with the remote node 604 via a NAT 626 which in turn communicates to the router 624.

Figure 7:
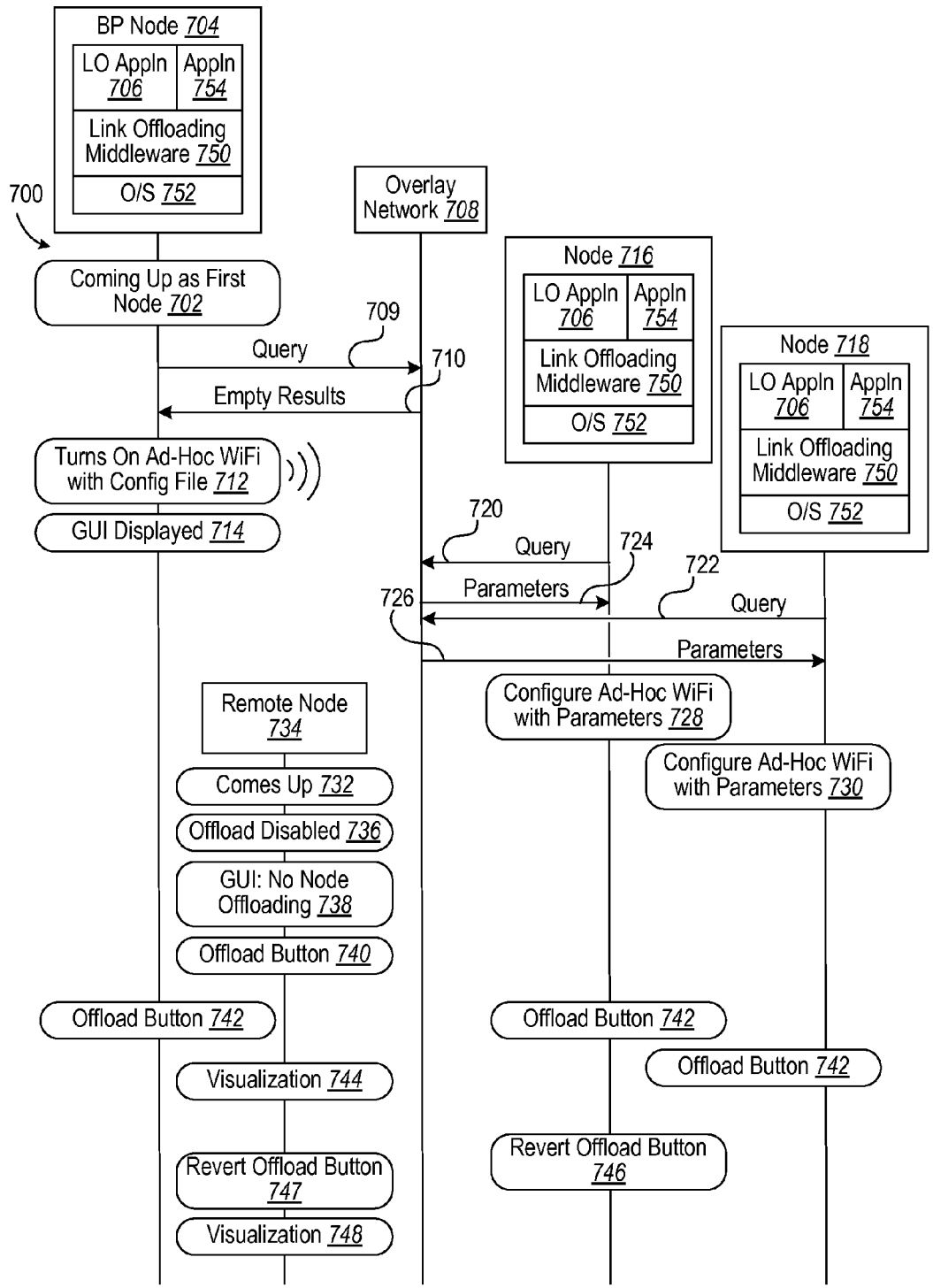
FIG. 7 illustrates a flow diagram for a methodology or sequence of operations for demonstrating link offloading.

In FIG. 7, a methodology or sequence of operations 700 for link offloading begins as depicted at 702 with a Bundle Protocol (BP) node 704 coming up as the first node. A link offloading application 706 on the BP node 704 queries an overlay 708 for ad-hoc WiFi offloading entry in the overlay 708 as depicted at 709. The overlay 708 returns an empty result to the query as depicted at 710. The link offloading application 706 turns on ad-hoc WiFi with a configuration file containing relevant parameters for link offloading and publishes relevant information (e.g., Service Set Identifier (SSID), channel number, etc.) in the overlay 708 (block 712). In block 714, a GUI is displayed on the BP node 704.

Nodes 716, 718 that do ad-hoc WiFi come up, with each querying the overlay 708 for ad-hoc WiFi offloading entry in the overlay 708 (blocks 720, 722, respectively). The respective queries return the earlier ad-hoc WiFi parameters from the overlay 708 as depicted at 724 and 726. A link offloading application 706 at each respective node 716, 718 configures ad-hoc WiFi using parameters that were received from the overlay 708 (blocks 728, 730, respectively).

In block 732, a remote node 734 comes up. In one aspect of the demonstration setup, at startup a link offloading application is disabled via command line option (block 736). None of the above steps are executed and a GUI indication is given "At this time no node is offloading" (block 738). User clicks on "offload" button on the remote node 734 (block 740). In block 742, on one (or many) of the host, user clicks on link offload button. A visualization tool can show all nodes, except remote node, communicating with this node via ad-hoc WiFi (block 744). User clicks a revert offload button (block 746). On the same host (remote node 734), user clicks on revert offload button (block 747). The visualization tool can show all nodes communicating with this node via Ethernet/WiFi (block 748).

In an exemplary aspect, the link offloading application 706 runs on a link offloading middleware 750, which in turn runs on an operating system 752. Connections for another application 754 that runs on the link offloading middleware 750 can be offloaded in a transparent fashion to the application 754.

Figure 8:
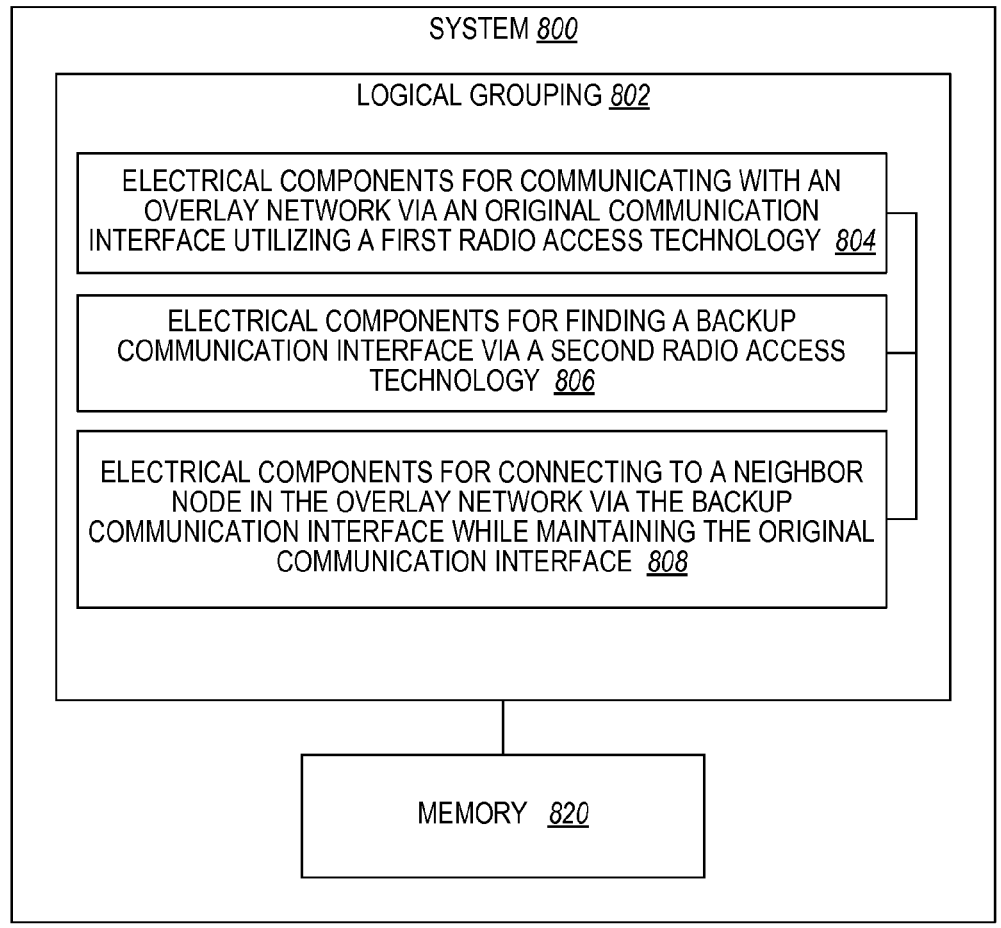
FIG. 8 illustrates a block diagram for a system such as user equipment having a logical grouping of electrical components for connectivity to an overlay network.

With reference to FIG. 8, illustrated is a system 800 for connectivity to an overlay network. For example, system 800 can reside at least partially within user equipment (UE). It is to be appreciated that system 800 is represented as including functional blocks, which can be functional blocks that represent functions implemented by a computing platform, processor, software, or combination thereof (e.g., firmware). System 800 includes a logical grouping 802 of electrical components that can act in conjunction. For instance, logical grouping 802 can include an electrical component for communicating with an overlay network from a first node via an original communication interface utilizing a first radio access technology 804. Moreover, logical grouping 802 can include an electrical component for finding a backup communication interface via a second radio access technology 806. For another instance, logical grouping 802 can include an electrical component for connecting to a neighbor node in the overlay network via the backup communication interface while maintaining the original communication interface 808. Additionally, system 800 can include a memory 820 that retains instructions for executing functions associated with electrical components 804-808. While shown as being external to memory 820, it is to be understood that one or more of electrical components 804-808 can exist within memory 820.

Figure 9:
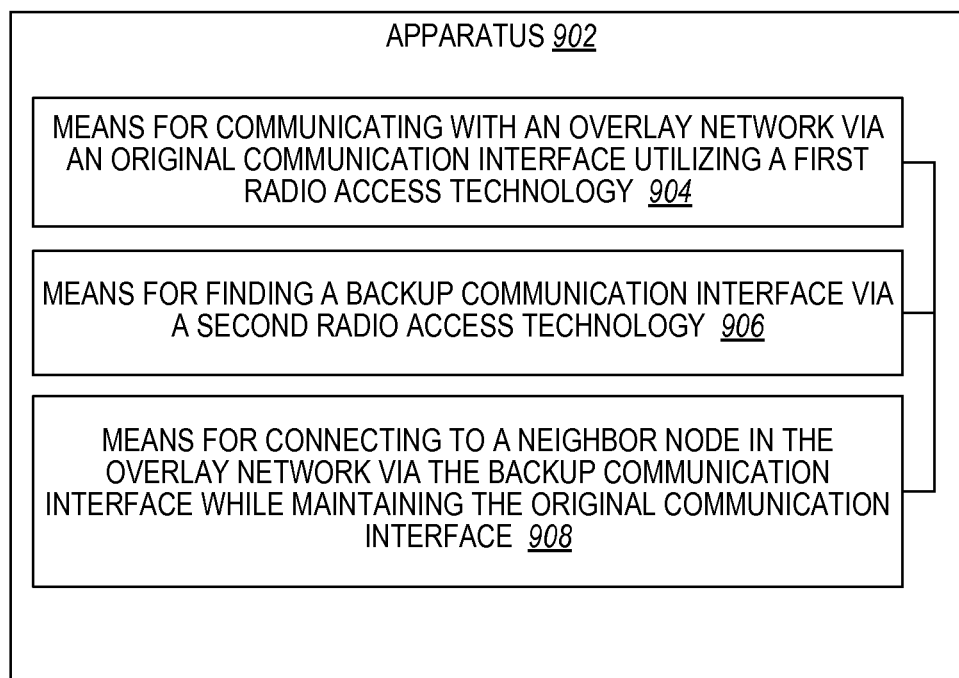
FIG. 9 illustrates a block diagram of an apparatus having means for connectivity to an overlay network.

In FIG. 9, an apparatus 902 is depicted for connectivity to an overlay network. Means 904 are provided for communicating with an overlay network from a first node via an original communication interface utilizing a first radio access technology. Means 906 are provided for finding a backup communication interface via a second radio access technology. Means 908 are provided for connecting to a neighbor node in the overlay network via the backup communication interface while maintaining the original communication interface.

Variations, modification, and other implementations of what is described herein will occur to those of ordinary skill in the art without departing from the spirit and scope of the disclosure as claimed. Accordingly, the disclosure is to be defined not by the preceding illustrative description but instead by the spirit and scope of the following claims.

What is claimed is:

1. A method of connectivity to an overlay network, comprising:
    communicating with a neighbor node in the overlay network from a first node via an original communication interface utilizing a first access technology;
    finding a backup communication interface via a second access technology; and
    connecting to the neighbor node in the overlay network via the backup communication interface while maintaining the communicating with the neighbor node via the original communication interface, wherein:
        based on routing positions in the overlay network, the neighbor node is an immediate routing neighbor of the first node that keeps track of the first node for ensuring correctness of routing in the overlay network;
        overlay network information pertinent to link offloading in the overlay network is stored and utilized for application layer or middleware layer link offloading to provide direct access to packets via a corresponding offloaded link; and at least one of the first access technology and the second access technology comprises a radio access technology.

2. The method of claim 1, further comprising switching from the original communication interface to the backup communication interface in response to a degradation in channel performance in the original communication interface to perform a seamless handoff without reestablishing an overlay connection.

3. The method of claim 2, wherein the degradation comprises a selected one of a group consisting of a disruption in the original communication interface, a data capacity of the original communication interface below a minimum threshold value, and an error rate of the original communication interface above a maximum threshold value.

4. The method of claim 1, further comprising triggering switching from the original communication interface to the backup communication interface to perform a seamless handoff without reestablishing an overlay connection.

5. The method of claim 4, further comprising:
accessing a preference for using the second access technology over the first access technology; and
switching the communicating with the neighbor node from the original communication interface to the backup communication interface,
wherein the original communication interface is via the first access technology and the backup communication interface is via the second access technology.

6. The method of claim 5, wherein the preference is based upon a subscription cost.

7. The method of claim 5, wherein the first access technology comprises a cellular radio access network and the second access technology comprises a local access network.

8. The method of claim 7, wherein the second access technology comprises a wireless local access network.

9. The method of claim 5, further comprising triggering switching from the original communication interface to the backup communication interface by performing data transmission on the backup communication interface while camping on the original communication interface.

10. The method of claim 9, further comprising automatically switching to the original communication interface in response to a disruption in the backup communication interface.

11. The method of claim 1, wherein the first and second access technologies are each selected from a group consisting of a femtocell, a picocell, a cellular macrocell, a Wireless Local Area Network (WLAN), and a Wireless Wide Area Network (WWAN).

12. The method of claim 1, further comprising:
determining an immediate neighbor set of one or more immediate routing neighbors according to the routing position;
wherein finding the backup communication interface further comprises determining one or more additional available communication interfaces;
selecting one of the one or more additional available communication interfaces as the backup communication interface; and
wherein the connecting to the neighbor node further comprises establishing redundant connections to the immediate neighbor set via the backup communication interface.

13. The method of claim 12, wherein the first access technology comprises a first wireless range and the second access technology comprises a second wireless range, wherein the first wireless range is substantially greater than the second wireless range.

14. The method of claim 13, wherein the original communication interface comprises a Wireless Wide Area Network (WWAN) interface and the backup communication interface comprises a Wireless Local Area Network (WLAN) interface.

15. The method of claim 13, wherein the original communication interface comprises a Wireless Local Area Network (WLAN) interface and the backup communication interface comprises a Personal Access Network (PAN) interface.

16. The method of claim 15, wherein the PAN interface comprises a BLUETOOTH interface.

17. The method of claim 12, wherein selecting the one of the one or more additional available communication interfaces further comprises selecting based on at least one of: which one of the available interfaces is most available, a random selection, or a policy/rule.

18. The method of claim 12, wherein the one or more routing neighbors comprise a second node and a third node, wherein the second node is a successor to the first node in a unidirectional routing chain defined by the overlay network, and wherein the third node is a successor to the second node in the unidirectional routing chain.

19. The method of claim 12, wherein the first node is associated to an identifier, and wherein joining the overlay network at the routing position further comprises determining a slot defining the routing position within a circular node identifier space based on the identifier.

20. At least one processor for connectivity to an overlay network, comprising:
a first module for communicating with a neighbor node in the overlay network from a first node via an original communication interface utilizing a first access technology;
a second module for finding a backup communication interface via a second access technology; and
a third module for connecting to the neighbor node in the overlay network via the backup communication interface while maintaining the communicating with the neighbor node via the original communication interface, wherein:
based on routing positions in the overlay network, the neighbor node is an immediate routing neighbor of the first node that keeps track of the first node for ensuring correctness of routing in the overlay network;
overlay network information pertinent to link offloading in the overlay network is stored and utilized for application layer or middleware layer link offloading to provide direct access to packets via a corresponding offloaded link; and
at least one of the first access technology and the second access technology comprises a radio access technology.

21. A computer program product for connectivity to an overlay network, comprising:
a non-transitory computer-readable medium storing sets of code comprising:
a first set of instructions for causing a computer to communicate with a neighbor node in the overlay network from a first node via an original communication interface utilizing a first access technology;

a second set of instructions for causing the computer to find a backup communication interface via a second access technology; and a third set of instructions for causing the computer to connect to the neighbor node in the overlay network via the backup communication interface while maintaining the communicating with the neighbor node via the original communication interface, wherein:

based on routing positions in the overlay network, the neighbor node is an immediate routing neighbor of the first node that keeps track of the first node for ensuring correctness of routing in the overlay network;

overlay network information pertinent to link offloading in the overlay network is stored and utilized for application layer or middleware layer link offloading to provide direct access to packets via a corresponding offloaded link; and at least one of the first access technology and the second access technology comprises a radio access technology.

22. An apparatus for connectivity to an overlay network, comprising:

means for communicating with a neighbor node in the overlay network from a first node via an original communication interface utilizing a first access technology;

means for finding a backup communication interface via a second access technology; and means for connecting to the neighbor node in the overlay network via the backup communication interface while maintaining the communicating with the neighbor node via the original communication interface, wherein:

based on routing positions in the overlay network, the neighbor node is an immediate routing neighbor of the first node that keeps track of the first node for ensuring correctness of routing in the overlay network;

overlay network information pertinent to link offloading in the overlay network is stored and utilized for application layer or middleware layer link offloading to provide direct access to packets via a corresponding offloaded link; and at least one of the first access technology and the second access technology comprises a radio access technology.

23. An apparatus for connectivity to an overlay network, comprising:

a transmitter for communicating with a neighbor node in the overlay network from a first node via an original communication interface utilizing a first access technology;

a receiver for finding a backup communication interface via a second access technology; and a computing platform for connecting to the neighbor node in the overlay network via the backup communication interface while maintaining the communicating with the neighbor node via the original communication interface, wherein:

based on routing positions in the overlay network, the neighbor node is an immediate routing neighbor of the first node that keeps track of the first node for ensuring correctness of routing in the overlay network;

overlay network information pertinent to link offloading in the overlay network is stored and utilized for application layer or middleware layer link offloading to provide direct access to packets via a corresponding offloaded link; and at least one of the first access technology and the second access technology comprises a radio access technology.

24. The apparatus of claim 23, wherein the computing platform via the transmitter and the receiver is further for switching from the original communication interface to the backup communication interface in response to a degradation in channel performance in the original communication interface to perform a seamless handoff without reestablishing an overlay connection.

25. The apparatus of claim 24, wherein the degradation comprises a selected one of a group consisting of a disruption in the original communication interface, a data capacity of the original communication interface below a minimum threshold value, and an error rate of the original communication interface above a maximum threshold value.

26. The apparatus of claim 23, wherein the computing platform via the transmitter and the receiver is further for triggering switching from the original communication interface to the backup communication interface to perform a seamless handoff without reestablishing an overlay connection.

27. The apparatus of claim 26, wherein the computing platform via the transmitter and the receiver is further for accessing a preference for using the second access technology over the first access technology, and for switching the communicating with the neighbor node from the original communication interface to the backup communication interface, wherein the original communication interface is via the first access technology and the backup communication interface is via the second access technology.

28. The apparatus of claim 27, wherein the preference is based upon a subscription cost.

29. The apparatus of claim 27, wherein the first access technology comprises a cellular radio access network and the second access technology comprises a local access network.

30. The apparatus of claim 29, wherein the second access technology comprises a wireless local access network.

31. The apparatus of claim 27, wherein the computing platform via the transmitter and the receiver is further for triggering switching from the original communication interface to the backup communication interface by performing data transmission on the backup communication interface while camping on the original communication interface.

32. The apparatus of claim 31, wherein the computing platform via the transmitter and the receiver is further for automatically switching to the original communication interface in response to a disruption in the backup communication interface.

33. The apparatus of claim 23, wherein the first and second access technologies are each selected from a group consisting of a femtocell, a picocell, a cellular macrocell, a Wireless Local Area Network (WLAN), and a Wireless Wide Area Network (WWAN).

34. The apparatus of claim 23, wherein the computing platform via the transmitter and the receiver is further for joining the overlay network, via the original communication interface, at a routing position in the overlay network;

determining an immediate neighbor set of one or more immediate routing neighbors according to the routing position;

determining one or more additional available communication interfaces;

selecting one of the one or more additional available communication interfaces as the backup communication interface; and establishing redundant connections to the immediate neighbor set via the backup communication interface.

35. The apparatus of claim 23, wherein the first communication interface comprises a long range wireless interface and the backup communication interface comprises a short range wireless interface.

36. The apparatus of claim 35, wherein the long range interface comprises a Wireless Wide Area Network (WWAN) interface and the short range interface comprises a Wireless Local Area Network (WLAN) interface.

37. The apparatus of claim 35, wherein the long range interface comprises a Wireless Local Area Network (WLAN) interface and the short range interface comprises a Personal Access Network (PAN) interface.

38. The apparatus of claim 37, wherein the PAN interface comprises a BLUETOOTH interface.

39. The apparatus of claim 23, wherein the computing platform via the transmitter and the receiver is further for selecting the one of the one or more additional available communication interfaces by selecting based on at least one of which one of the available interfaces is most available, a random selection, or a policy/rule.

40. The apparatus of claim 23, wherein the one or more routing neighbors comprise a second node and a third node, wherein the second node is a successor to the first node in a unidirectional routing chain defined by the overlay network, and wherein the third node is a successor to the second node in the unidirectional routing chain.

41. The apparatus of claim 23, wherein the first node is associated to an identifier, and wherein joining the overlay network at the routing position further comprises determining a slot defining the routing position within a circular node identifier space based on the identifier.

* * * * *